Patented Apr. 20, 1948

2,439,953

UNITED STATES PATENT OFFICE 2,439,953

LOW-LOSS THERMOSETTING RESINS

Jack Swiss and Newton C. Foster, McKeesport, Pa., assignors to Westinghouse Electric Corporation, East Pittsburgh, Pa., a corporation of Pennsylvania No Drawing. Application March 21, 1944, Serial No. 527,483

9 Claims. (Cl. 154—43)

This invention relates to resinous compositions and, more particularly, to resinous compositions suitable for preparing low loss electrical insulation capable of operating at elevated temperatures.

This application is a continuation in part of our copending application, Serial No. 416,586, filed October 25, 1941, now abandoned.

Thermosetting resins are frequently employed in preparing electrical insulation because of their temperature-strength features, but in general are characterized by relatively high power factor. Thus, phenolic resins, urea-formaldehyde condensates, and urea-melamine aldehyde resins all have power factors of 2% and higher. For some purposes, other desirable properties of thermosetting resins, such as heat resistance, make it advantageous to employ the resins in spite of the high power factor.

Thermoplastic resins, on the other hand, are available with low power factors, for example, 0.3% and lower, but the nature of thermoplastic resins renders their use unsuitable for applications where they are subjected to temperatures much above room temperature. At temperatures of 70° C. to 100° C. thermoplastic resins may be easily deformed, sometimes even under their own weight. Furthermore, since thermoplastic resins are readily soluble in many solvent liquids they cannot be employed in contact with hot dielectric fluids, such for example, as transformer oil.

The object of this invention is to provide for a synthetic thermosetting resin having low electrical losses.

Another object of the invention is to provide for a composite material bonded with a thermosetting resin having predetermined electrical properties and suitable for use at elevated temperatures.

Other objects of the invention will, in part, be obvious and will, in part, appear hereinafter.

For a more complete description of the invention, reference may be had to the following detailed specification and claims.

According to this invention, a low loss thermosetting resin is prepared with the properties of low power factor, low loss factor and infusibility even at temperatures of the order of 250° C. In addition, the resin is resistant to hot oil dielectric liquids commonly employed in electrical apparatus. The thermosetting resin is suitable for combination with fillers, such as paper, cloth, and inorganic material to prepare composite and laminated bodies having a wide range of physical characteristics and characterized by exceptionally good electrically insulating properties.

The resin is prepared by chemically reacting a minor proportion of the reaction product of an unsaturated alpha-beta ethylenic dicarboxylic acid, such as maleic anhydride, and the polyhydric alcohol ester of a hydroxylated unsaturated fatty acid, such as castor oil, with a major proportion of styrene, or simple substituted styrenes. The resin composition comprises from 95% to 75% of styrene and from 5% to 25% of the reaction product of castor oil and maleic anhydride. Monostyrene is a solvent for the maleic anhydride castor oil product and by combining the ingredients a solution is produced which may be subjected to copolymerization under the influence of a catalyst and heat. The copolymer is an infusible thermoset resin.

As one example of the preparation of the reaction product to be copolymerized with styrene, the following is given:

30 parts by weight of castor oil were mixed with 10 parts by weight of maleic anhydride and heated at a temperature of from about 100° C. to 140° C. for from 2 to 4 hours. The product had a thick molasses-like consistency.

It is generally advisable to carry out the reaction in a closed vessel provided with a condenser to avoid sublimation of the maleic anhydride into the atmosphere. A catalyst is not required since heating alone is sufficient to cause the reaction to proceed. If desired, an esterification catalyst, such as para-toluene sulfonic acid, may be added in amount of from 0.1% of the weight of the reactants or higher.

The reaction product is believed to be the half ester of maleic anhydride, with a molecule of maleic anhydride coupled to the fatty acid radical at the hydroxy group. Since each molecule of castor oil consists of three ricinoleic radicals, as many as three maleic anhydride molecules can be esterified by one castor oil molecule. For the practice of the present invention the full half ester is particularly useful, but castor oil esterified with less than three molar equivalent of maleic anhydride may be employed. For each 100 parts of castor oil from 10 to 33 parts of maleic anhydride may be used—though the products of from 2 to 3 mols of maleic anhydride to one mol castor oil are preferred.

In carrying out the esterification, maleic anhydride is the preferred alpha-beta ethylenic unsaturated dicarboxylic acid because of its availability and high activity. However, the simple substituted maleic anhydrides, such for example, as citraconic anhydride, are equally useful and may replace a part or all of the maleic anhydride. The anhydrides of the dibasic acids are much easier to react than the corresponding acids, since the anhydrides do not give off water. With provision to remove water, maleic acid, fumaric acid, citraconic acid and the like can be reacted, generally with slight increases in temperatures.

For the esterification reaction, castor oil is an economical, convenient and readily available hydroxylated unsaturated fatty acid ester of a polyhydric alcohol. The reaction may be carried out by employing the esters of ricinoleic acid with ethylene glycol, propylene glycol, pentaerythritol and other polyhydric alcohols to replace a part or all of the castor oil. In some cases the esters of monohydroxystearic and dihydroxystearic acids with polyhydric alcohols can be admixed with the castor oil or its equivalent.

In the specification, reference will be made to castor oil-maleate, it being understood that the ester reaction products of other ethylene alpha-beta dibasic acids and other fatty acid esters may be used in a similar manner.

The copolymer of styrene with a minor proportion of castor oil-maleate is exemplary of the copolymers which may be produced. When the copolymer of the castor oil-maleic anhydride reaction product with monostyrene contains from 5% to 10% of the ester, it has a low power factor of the order of .13% to .24% at 1000 cycles. As the proportion of castor oil-maleate is increased to 25% of the copolymer, the power factor rises slightly to a figure of .3% to .4% at 1000 cycles. On the other hand, the resin produced with the larger proportions of castor oil-maleate is somewhat softer and more flexible than the resin with intermediate amounts of the ester. This may be due to the plasticizing effect of the castor oil, although it is desired not to be bound by this explanation.

Other simple substituted styrenes may be copolymerized with minor proportions of the castor oil-maleate. For example alpha methyl styrene, alpha methyl para methyl styrene and para mono chlorstyrene may be so copolymerized to advantage. In general, nuclear monohalide styrenes and nuclear monoalkyl styrenes alone or mixed, or combined with monostyrene may be satisfactorily copolymerized with castor oil-maleate. While the subsequent examples mention monostyrene, it will be understood that the nuclear mono-substituted styrenes are also contemplated.

The following example is one mode of preparing the low loss thermosetting resin. 10 parts by weight of the half ester of castor oil and maleic acid was dissolved in 90 parts of monomeric styrene and a clear, mobile solution was produced. One-tenth of 1% of benzoyl peroxide admixed with monostyrene to form a 2% solution was added and thoroughly dispersed in the solution to provide for a polymerizing catalyst. The solution can be applied to various fabrics, and papers, or fillers may be added if desired. The solution with the catalyst was placed in an oven and kept at a temperature of 80° C. for 12 hours. The mixture had set firmly at the end of this time and was heated for an additional two hours at 150° C. to complete the reaction. A hard, transparent body with a yellowish tinge resulted. The resin prepared had a power factor of 0.26% at 1000 cycles. Immersion in water for 26 hours gave an increase in weight of 0.1%. After immersion in transformer oil for 24 hours at 92° C., no substantial change in weight or other properties was observed.

The resin produced by condensing the castor oil-maleate with monostyrene in the proportions indicated above may be modified by minor additions of other low electrical loss compounds to the monostyrene solution to provide for predetermined viscosity, fire resistance and products having different degrees of flexibility. For example, when from 5 to 10% polystyrene is incorporated in the solution of monostyrene with the castor oil-maleate, the solution will be much more viscous. It may be more suitable for impregnating cotton fabrics, paper, glass wool, and the like, successfully, than a less viscous solution. The more polystyrene that is added, the more viscous the solution becomes and it will adhere in larger quantities to the filler.

Coumarone-indene resins sold under the trade name of Nevillite have been added to the solution in order to produce a more transparent copolymer and to lessen the cost. With 20% coumarone-indene resin present, the solid produced is practically water-white.

In order to confer fire-resisting properties to the thermosetting resin, halogenated hydrocarbons, such for example, as hexachlorobiphenyl, which have a substantially zero dipole moment may be added to the resin in quantities of up to 40% to confer a high degree of fire resistance. The power factor and the water absorption will be low with even large quantities of the halogenated hydrocarbon compounds present.

As an example of a laminated material that was prepared, kraft paper was impregnated with the thermosetting resin prepared by producing a solution of 7% castor oil-maleate, 68% monostyrene, 5% polystyrene, and 20% of a coumarone-indene resin with a small proportion of benzyl peroxide added. The quantity of resin applied was approximately 40% of the weight of the paper. The sheets of paper were superimposed to produce a laminated structure which was pressed at 10 pounds per square inch, while subjected to temperatures of 150° C. A deep brown colored laminated member was produced. The laminated paper member had a power factor of 0.5% at 60 cycles, while the resin alone had a power factor of only 0.13% at 60 cycles. Immersion in hot transformer oil at 75° C. for 24 hours did not produce any significant change in either the resin or laminated member.

At 60° C., the resin begins to exhibit rubbery properties but is infusible even at 250° C. The property of becoming rubbery and elastic at elevated temperatures is particularly useful in electrical apparatus since the resin will accommodate itself to changes in structural dimensions and return to its initial shape when the distortion due to thermal expansion has disappeared on cooling.

A composition having fire-proof properties was prepared from 10 parts by weight of castor oil-maleate, 25 parts hexachlorbiphenyl, 65 parts of monostyrene, and one-tenth of 1% of benzoyl peroxide. A hard body was attained after the solution was heated at 80° C. for 12 hours, followed by one hour's heating at 150° C. The product was a transparent solid with a yellow tint. The power factor at 1000 cycles was 0.2%. The water absorption after 96 hours immersion was substantially negligible and the power factor remained at 0.2%. The resin had non-inflammable characteristics. At temperature of 60° and higher, it became somewhat rubbery and elastic.

The resinous solution of monostyrene and copolymer may be employed as an impregnant or filling compound for bushings employed in electrical apparatus. In some cases coils and other electrical members may be impregnated with the solution and upon polymerization good insulation is secured. After heat treatment in the presence of a small amount of catalyst, the resin will condense to an infusible state. The product will be free from plastic flow until temperatures of the order of 250° C. have been reached. Above 60° the resin will readily accommodate itself to mechanical stresses.

While benzoyl peroxide has been indicated as a suitable catalyst for the three-component resin disclosed, other equivalent catalysts such as peroxides and ozonides are known to those skilled in the art and need not be listed in detail. The catalyst with or without heat may be employed in producing a solid polymer from the mixture.

The additions of plasticizers or fire-proofing compounds as previously disclosed in quantities up to 50% of the weight of the three-component mixture is contemplated by the invention. The prime requirement for the fillers or fire-proofing agents in producing electrical insulation is a low power factor. Halogenated aryl compounds of substantially zero dipole moment and hydrogenated naphthalenes are believed to be indicative of desirable types of fillers and plasticizers since they do not cause objectionable increase in power factor.

While we have shown and described several embodiments of our invention in accordance with the patent statutes, it is obvious that various changes may be made in the structural details without departing from the spirit of the invention.

We claim as our invention:

1. A composition of matter consisting of a solution of from 75 to 95 parts by weight of styrene with from 5 to 25 parts by weight of the soluble ester reaction product of maleic anhydride and castor oil.

2. A composition of matter consisting of the resinous reaction product of from 75 to 95 parts by weight of styrene with from 5 to 25 parts by weight of the soluble ester reaction product of maleic acid and castor oil.

3. A composition of matter consisting of the resinous reaction product of from 75 to 95 parts by weight of a vinyl aryl compound selected from the group consisting of styrene, alpha methyl styrene and monohalide and monoalkyl nuclear substituted styrene; from 5 to 25 parts by weight of the soluble ester reaction product of castor oil and an unsaturated alpha-beta ethylenic dicarboxylic acidic compound selected from the group consisting of maleic anhydride, maleic acid, fumaric acid, citraconic acid and citraconic anhydride, and up to 50 parts of a plasticizer selected from the group of low electrical loss organic compounds consisting of coumarone-indene resins, halogenated aryl compounds of substantially zero dipole moment and hydrogenated naphthalenes.

4. A laminated member comprising, in combination, a plurality of sheets of fibrous material and a binder for the sheets of fibrous material consisting of the resinous reaction product of from 75 to 95 parts by weight of a vinyl aryl compound selected from the group consisting of styrene, alpha methyl styrene and monohalide and monoalkyl nuclear substituted styrene and from 25 to 5 parts by weight of the soluble ester reaction product of an unsaturated alpha-beta ethylenic dicarboxylic acidic compound selected from the group consisting of maleic anhydride, maleic acid, fumaric acid, citraconic acid and citraconic anhydride, with castor oil.

5. A laminated member comprising, in combination, a plurality of sheets of fibrous material and a binder for the sheets of fibrous material consisting of the resinous reaction product of from 75 to 95 parts by weight of a vinyl aryl compound selected from the group consisting of styrene, alpha methyl styrene, and monohalide and monoalkyl nuclear substituted styrene and from 25 to 5 parts by weight of the soluble ester reaction product of an unsaturated alpha-beta ethylenic dicarboxylic acidic compound selected from the group consisting of maleic anhydride, maleic acid, fumaric acid, citraconic acid and citraconic anhydride, with castor oil, and not more than 50 parts by weight of a plasticizer in the resinous product to provide for predetermined toughness.

6. A low electrical loss composite material comprising, in combination, a plurality of sheets of fabric and a thermosetting resin for bonding the sheets of fabric, the thermosetting resin composed of the reaction product of from 75 parts to 95 parts by weight of styrene and from 5 to 25 parts of the soluble half ester of maleic anhydride and castor oil.

7. A low electrical loss composite material comprising, in combination, a plurality of sheets of fabric and a thermosetting resin for bonding the sheets of fabric, the thermosetting resin composed of the reaction product of from 75 parts to 95 parts by weight of a vinyl aryl compound selected from the group consisting of styrene alpha methyl styrene and the monohalide and monoalkyl nuclear substituted styrene and 5 to 25 parts by weight of the soluble half ester of maleic acid and castor oil, and not more than 50 parts by weight of a low loss plasticizer selected from the group consisting of coumarone-indene resins, halogenated aryls of substantially zero dipole moment and hydrogenated polymers of naphthalene.

8. A composition of matter consisting of the solution of from 75 to 95 parts by weight of a vinyl aryl compound selected from the group consisting of styrene, alpha methyl styrene, and nuclear monohalide and monoalkyl substituted styrenes and from 5 to 25 parts by weight of the soluble ester reaction product of castor oil and an unsaturated alpha-beta ethylenic dicarboxylic acidic compound selected from the group consisting of maleic anhydride, maleic acid, fumaric acid, citraconic acid and citraconic anhydride.

9. A composition of matter consisting of the resinous reaction product of from 75 to 95 parts by weight of a vinyl aryl compound from the group consisting of styrene, alpha methyl styrene and monohalide and monoalkyl nuclear substituted styrene, and from 5 to 25 parts by weight of the soluble ester reaction product of castor oil and an unsaturated alpha-beta dicarboxylic acidic compound selected from the group consisting of maleic anhydride, maleic acid, citraconic acid, citraconic anhydride and fumaric acid.

JACK SWISS.
NEWTON C. FOSTER.

(References on following page)

REFERENCES CITED

The following references are of record in the file of this patent:

UNITED STATES PATENTS

| Number | Name | Date |
|---|---|---|
| 2,255,313 | Ellis | Sept. 9, 1941 |

FOREIGN PATENTS

| Number | Country | Date |
|---|---|---|
| 367,658 | Great Britain | Feb. 25, 1932 |

OTHER REFERENCES

Richter, "Organic Chemistry," vol. I, translated by Spielmann, 2d English edition, p. 492; published by P. Blakiston's Son & Co., Philadelphia.